United States Patent [19]

Brück

[11] Patent Number: 5,468,455
[45] Date of Patent: Nov. 21, 1995

[54] HONEYCOMB BODY WITH AN INTERNAL STRUCTURE THAT IS RETAINED IN A FRAME AND A METHOD OF PRODUCING THE SAME

[75] Inventor: Rolf Brück, Bergisch-Gladbach, Germany

[73] Assignee: Emitec Gesellschaft fuer Emissionstechnologie mbH, Lohmar, Germany

[21] Appl. No.: 263,144

[22] Filed: Jun. 21, 1994

Related U.S. Application Data

[63] Continuation of PCT/EP92/02934 Dec. 17, 1992.

[30] Foreign Application Priority Data

Dec. 21, 1991 [DE] Germany ............... 41 42 597.9

[51] Int. Cl.⁶ ................ F01N 3/28; B01D 53/36
[52] U.S. Cl. ............... 422/180; 422/174; 422/179; 422/199; 422/222; 60/299; 60/300; 502/439; 502/527; 428/593
[58] Field of Search ............... 422/174, 179, 422/180, 199, 222; 60/299, 300; 502/439, 527; 428/593

[56] References Cited

U.S. PATENT DOCUMENTS

| | | | |
|---|---|---|---|
| 4,845,073 | 7/1989 | Cyron | 502/527 |
| 5,068,218 | 11/1991 | Nishizawa | 502/527 |
| 5,079,210 | 1/1992 | Kaji et al. | 502/527 |
| 5,084,361 | 1/1992 | Toyoda et al. | 502/527 |
| 5,094,074 | 3/1992 | Nishizawa et al. | 422/180 |
| 5,146,743 | 9/1992 | Maus et al. | 422/174 |
| 5,277,937 | 1/1994 | Bagley et al. | 502/527 |

FOREIGN PATENT DOCUMENTS

| | | | |
|---|---|---|---|
| 0279159 | 8/1988 | European Pat. Off. | B01J 35/04 |
| 2020596 | 5/1969 | France | F01N 1/00 |
| 4111629 | 10/1991 | Germany | F01N 3/28 |
| 8907488 | 8/1989 | WIPO | F01N 3/28 |
| 8910470 | 11/1989 | WIPO | F01N 3/28 |
| 8910471 | 11/1989 | WIPO | F01N 3/28 |
| 9003220 | 4/1990 | WIPO | F01N 3/28 |
| 9008249 | 7/1990 | WIPO | F01N 3/28 |
| 9012951 | 11/1990 | WIPO | F01N 3/28 |
| 9001178 | 2/1991 | WIPO | F01N 3/28 |
| 9101807 | 2/1991 | WIPO | F01N 3/28 |

*Primary Examiner*—Robert J. Warden
*Assistant Examiner*—Hien Tran
*Attorney, Agent, or Firm*—Herbert L. Lerner; Laurence A. Greenberg

[57] ABSTRACT

A honeycomb body includes an axis along which a flow of fluid is to be conducted through the honeycomb body. At least two oppositely disposed end surfaces define the honeycomb body along the axis. An internal structure for conducting an electric current for heating is formed of at least one sheet-metal layer. Metal support configurations each support the internal structure at a respective one of the end surfaces. An electric insulation is disposed between the internal structure and the support configuration. A method for producing an electrically heatable honeycomb body includes producing at least one approximately rectangular sheet-metal layer having two opposed end edges being aligned approximately perpendicularly to an axis. Each end edge is encompassed with a folded joint having a ceramic layer resting on the at least one sheet-metal layer, to form support configurations. The sheet-metal layer and the folded joints are corrugated at obtuse angles preferably being approximately perpendicularly to the axis. The sheet-metal layer including the folded joints are layered in layers and the layers are wound about the axis. The support configurations are mounted in jacket tubes. Force-locking connections are produced in the support configurations between the layers formed with the folded joints.

22 Claims, 4 Drawing Sheets

HONEYCOMB BODY WITH AN INTERNAL STRUCTURE THAT IS RETAINED IN A FRAME AND A METHOD OF PRODUCING THE SAME

CROSS-REFERENCE TO RELATED APPLICATION

This application is a Continuation of International Application Serial No. PCT/EP92/02934, filed Dec. 17, 1992.

BACKGROUND OF THE INVENTION

Field of the Invention The invention relates to a honeycomb body having an axis along which it can conduct a flow of fluid through the honeycomb body, and the honeycomb body extends along the axis and it is delimited by two opposed ends.

The invention relates particularly to honeycomb bodies that are suitable for and intended as carrier bodies for catalytic converters, for instance in motor vehicle exhaust systems.

Honeycomb bodies that are formed of metal structures, in particular at least partially structured metal sheets, are described in Published International Application WO 89/07488 and in Published International Application WO 90/03220, corresponding to U.S. Pat. No. 5,135,794. In order to form such honeycomb bodies, metal sheets, including corrugated sheets, are disposed in layers and wound around an axis. In order to increase mechanical stability, the layers may be partially reinforced. The reinforcements need not extend over the entire length of a honeycomb body along its axis but rather may be limited to portions, in particular portions in the vicinity of ends of the honeycomb body.

In order to provide purposeful variation of the flow of a fluid, for instance exhaust gas from an internal combustion engine, through a honeycomb body, the sheets forming a honeycomb body may be provided with small structures. Turbulence that improves the contact of the fluid with the honeycomb body and thus reinforces a reaction effected by a catalyst on the honeycomb body in the fluid occur, for instance, at such structures. In Published International Application WO 90/08249, the metal sheets forming a honeycomb body are provided with microstructures which extend crosswise or at an angle relative to the flow direction of the fluid. Such microstructures include fluting, beads, bumps, or grooves. In Published International Application WO 91/01178, corresponding generally to co-pending U.S. application Ser. Nos. 711,564, filed May 30, 1991 and 900,836, filed Jun. 18, 1992, the metal sheets forming the honeycomb bodies are provided with openings, with which flow baffles are associated. Such flow baffles are capable of conducting partial streams of the fluid flowing through the honeycomb body through the openings and thus reduce boundary layer effects. Through the use of a systematic configuration of openings and flow baffles, the flow profile in the honeycomb body can additionally be made more uniform. In Published International Application WO 91/01807, corresponding generally to U.S. Pat. Nos. 5,045,403 and 5,130,208, corrugated metal sheets in the honeycomb body are provided with folded-over features, which form additional leading edges in the interior of the honeycomb body and likewise make it possible to suppress boundary layer effects.

In Published European Application No. 0 279 159 A1, corresponding to U.S. Pat. No. 4,845,073, a metal catalyst carrier body is formed of alternating layers of two differently corrugated metal sheets. A honeycomb body of that kind is distinguished by especially high mechanical strength. It is particularly well suited for applications that involve high thermal alternating strains.

Published International Application WO 89/10470 and Published International Application WO 89/10471 disclose honeycomb bodies formed of metal sheets, that are directly electrically heatable. Since conventional catalytic converters for use in the exhaust systems of internal combustion engines do not develop their effectiveness until reaching elevated temperatures, typically above approximately 300° C., no catalytic reaction initially ensues at the onset of a flow of exhaust gas around a cold catalyst, so that the catalyst must first be preheated to an adequately high temperature. In order to speed up such preheating or even accomplish it before an engine is turned on, a metal honeycomb body can be heated directly electrically, by passing an electrical current through it. The electrical resistance of the honeycomb body may have to be adapted to the properties of the electrical power source which is available. In a honeycomb body for use in a motor vehicle, there must be a current path with a resistance on the order of magnitude of 0.1 Ohms for the electrical current to pass through. In order to attain that, the honeycomb body can be electrically subdivided in its cross-sectional area and/or its axial length by means of gaps and/or electrically insulating intermediate sheets. In Published International Application WO 90/12951, the strength of an electrically directly heatable honeycomb body can be increased by incorporating form-locking connections in the honeycomb body between sheets and ceramic intermediate sheets, with every two sheets enclosing one ceramic intermediate sheet. A form-locking connection is one which connects two elements together due to the shape of the elements themselves, as opposed to a force-locking connection, which locks the elements together by force external to the elements.

The information available from the prior art on the way in which to construct an electrically directly heatable honeycomb body, especially a honeycomb body for use as a carrier body for a catalytic converter in a motor vehicle exhaust system, does not in every case assure an adequately stable and mechanically loadable structure. Incorporating gaps and/or electrically insulating sheets, such as ceramic layers, may involve a sacrifice in terms of force-locking connections between various layers in the honeycomb body and thus may cause intolerable loosening of the mechanical structure of the honeycomb body.

SUMMARY OF THE INVENTION

It is accordingly an object of the invention to provide a honeycomb body with an internal structure that is retained in a frame and a method of producing the same, which overcome the hereinafore-mentioned disadvantages of the heretofore-known devices and methods of this general type, in which assuring tolerable resistance to electric heating does not require any substantial sacrifices in mechanical strength and in which simple, time-tested capabilities from the production of honeycomb bodies that need not be electrically heated are usable to form requisite force-locking connections.

With the foregoing and other objects in view there is provided, in accordance with the invention, a honeycomb body, comprising an axis along which a flow of fluid is to be conducted through the honeycomb body; at least two oppositely disposed end surfaces defining the honeycomb body along the axis; an internal structure for conducting an electric current for heating, the internal structure being formed of at least one sheet-metal layer; metal support configurations each supporting the internal structure at a respective one of the end surfaces; and an electric insulation disposed between the internal structure and the support configuration.

In the honeycomb body according to the invention, components that assure mechanical strength are separate from components that are directly electrically heatable. The honeycomb body includes an internal structure that is electrically heatable, and it has a physical structure in which all of the known teaching on assuring an electrical resistance that is tolerable in a particular situation can be utilized. It is also possible to exploit the fact that the internal structure requires no particular intrinsic stability, since the mechanical strength and loadability of the honeycomb body is determinable according to the invention by two frames, one on each end of the honeycomb body, that retain the internal structure but are electrically insulated from the internal structure.

Joining electrical connections to the internal structure should be carried out in accordance with the configuration of the current path taken by the electric current through the internal structure. Neither an electrical connection nor the internal structure itself needs to absorb mechanical strains, and therefore according to the invention there is great freedom of construction with respect to the current path and the electrical connections.

In accordance with another feature of the invention, the retention of the internal structure in each frame is provided essentially by friction, for instance by one metal sheet forming the internal structure being clamped in place in each frame. Retention by friction is adequate as a rule, particularly whenever the honeycomb body is joined to the frame with the other components of the line or pipe system to which it belongs.

In accordance with a further feature of the invention, the insulation between the internal structure and the frame is essentially at least one ceramic layer, and depending on the construction of the internal structure and the frame, it is a plurality or multiplicity of ceramic layers. Ceramic layers are especially thermally stable and are therefore especially suitable for honeycomb bodies that must withstand high thermal strains. The ceramic layer may be an applied coating on a metal sheet of the internal structure or of the frame. In a variant, it may also be formed by a ceramic fiber mat, a foil of sintered glass ceramic, or the like. Foils of sintered glass ceramic are especially advantageous, because they can be quite thin, are very flexible, and have only a slight tendency toward brittle fractures.

In accordance with an added feature of the invention, the retention of the internal structure in each frame is provided by having the sheet in the internal structure encompassed and clamped in place by a lock seam or folded joint located in the frame. Naturally, this lock seam or folded joint must encompass not only the metal sheet but the corresponding insulation as well.

In accordance with an additional feature of the invention, the insulation is a ceramic layer adhering to the lock seam or folded joint.

At an end on which it is folded, a lock seam or folded joint often has relatively major variations in the metallic microstructure that it includes. In accordance with yet another feature of the invention, in order to prevent possible material damage from brittle fractures or the like under a later operational load, the lock seam or folded joint is provided in the vicinity of the end with a brazing material inlay that contains brazing material and preferably is formed of brazing material. This brazing material inlay brings about a certain brazing of the contacting parts of the lock seam or folded joint to one another and thus reliably prevents breaking apart of the lock seam or folded joint. Naturally, the brazing material inlay must be spaced apart from the internal structure sheet to be insulated.

In accordance with yet a further feature of the invention, each frame is surrounded by an associated jacket tube and secured in it. This is advantageous, especially with a view toward providing an advantageous securing of the honeycomb body in a line or pipe system. Such a jacket tube is highly suitable to form connections with other tubes and depending on the requirement, it may be provided with a flange.

In accordance with yet an added feature of the invention, the metal sheet in the internal structure of the honeycomb body is corrugated and defines a corrugation height and a corrugation length. The provision of a corrugated sheet to form the honeycomb body of the invention is important in order to achieve characteristics of many structural forms that are known per se. Moreover, in a metal sheet used to make up a honeycomb body of the invention, a corrugation has a special advantage in association with the provision of a lock seam or folded joint to retain the sheet in each frame. As a rule, the corrugations of a corrugated sheet in a honeycomb body are aligned parallel to the axis. A lock seam or folded joint, which in a frame on the end of a honeycomb body according to the invention encompasses a sheet that is corrugated in the known manner, must in turn be corrugated. Advantageously, a sheet and the lock seam or folded joint encompassing this sheet are corrugated simultaneously. Smooth lock seams or folded joints are slipped onto the smooth sheet, and then the corrugation is made in a manner which is known per se. A corrugated seam has the major advantage that it does not crease, or creases only insignificantly, when it is bent to form a wound or intertwined honeycomb body. It has been demonstrated that smooth lock seams or folded joints can easily crease in a winding or intertwining process of this kind, which may impair the strength of a frame formed of a lock seam or a folded joint of this kind.

The advantages resulting from the use of corrugated sheets are gained in a special way if only corrugated sheets, preferably corrugated sheets having two different corrugation patterns, are used to form the honeycomb body and are layered in alternation on one another.

In accordance with yet an additional feature of the invention, in the formation of the honeycomb body according to the invention from a corrugated first sheet with a first corrugation length and a first corrugation height and a second sheet with a second corrugation length and a second corrugation height, advantageously the first corrugation length is selected to be approximately equal to the second corrugation length. In this way, the corrugations can mesh with one another, which can be significant in order to achieve high mechanical strength. Admittedly, the intermeshing of two corrugation patterns with one another is not necessarily uniform, when the corrugations are wound or intertwined. The intermeshing can be optimized as needed by suitably adapting the corrugation lengths to one another. Advantageously, first corrugation heights and second corrugation heights that differ markedly from one another will be chosen, in order to preclude direct contact of the corrugations on one another over relatively wide regions without leaving adequately large channels between them.

In accordance with again another feature of the invention, the first corrugation height is advantageously chosen to be greater than the second corrugation height, in fact in particular at least twice as great and preferably three times as great.

In accordance with again a further feature of the invention, both the internal structure and the frames of the honeycomb body are disposed in layers (as explained above for a special case), and the layers are wound around the axis in the manner of a spiral or involute. Such features are known per se in many forms and can be included in embodiments of the invention.

In accordance with again an added feature of the invention, the internal structure is subdivided by electrical insulations between the layers. As already noted, the invention only makes very slight demands on the mechanical intrinsic stability of the internal structure. Accordingly, the internal structure is very particularly suitable for forming a current path with an electrical resistance that is adapted to a predetermined current source, for which purpose subdivisions in the form of insulating sheets and gaps can be provided. It is entirely conceivable with the invention, in electrically heatable honeycomb bodies for use in motor vehicle exhaust systems, which require electrical powers of 2 kW to be typically made available for the heating thereof, to achieve electrical resistances between 0.05 Ohms (tolerable for an approximately 12 V electrical voltage source) and 20 Ohms (tolerable for an approximately 200 V electrical voltage source, this being the voltage of the public power grid in Europe).

In accordance with again an additional feature of the invention, since the frames are the essential load bearing parts of the honeycomb body depending on the embodiment, the layers are largely completely joined together force-lockingly in each frame, in particular by brazing points. Since the frames are disposed on the ends of the honeycomb body, the honeycomb body can be assembled as much as possible without prior inclusion of brazing material, and then for application of the brazing material it is dipped into a bath or fluidized bed that contains the brazing material and optionally is then heat-treated in order to fuse the brazing material. This option as well, which is known for producing simple honeycomb bodies, can be used along the lines of the invention to produce electrically heatable honeycomb bodies of complicated construction.

In accordance with still another feature of the invention, there are provided smooth sheet-metal strips and/or corrugated sheet-metal strips which are inserted between layers in each frame of the honeycomb body and force-lockingly joined to the layers, the layers being understood to be layered lock seams or folded joints or the like. Through the insertion of such sheet-metal strips, on one hand stable air gaps can be formed in the internal structure, which may be important for an electrically heatable internal structure, and on the other hand the thermal capacity of a frame can be reduced by inserting such sheet-metal strips. This may also be important for a honeycomb body with an electrically heatable internal structure, since each frame must also be heated simultaneously with the internal structure, which requires more energy, the greater the thermal capacity of the frame.

With the objects of the invention in view, there is also provided a method for producing an electrically heatable honeycomb body, which comprises producing at least one approximately rectangular sheet-metal layer having two opposed end edges being aligned approximately perpendicularly to an axis; encompassing each end edge with a folded joint having a ceramic layer resting on the at least one sheet-metal layer, to form support configurations; corrugating the at least one sheet-metal layer and the folded joints at obtuse angles preferably approximately perpendicularly to the axis; layering the at least one sheet-metal layer including the folded joints in layers and winding the layers about the axis; mounting the support configurations in jacket tubes; and producing force-locking connections in the support configurations between the layers formed with the folded joints.

Such force-locking connections may be brazing points. By way of example, these brazing points can be formed by immersing the frames in a bath or fluidized bed containing a brazing material and heat-treating them afterward in order to fuse the brazing material.

In accordance with a concomitant mode of the invention, the production of the honeycomb body according to the invention is advantageously carried out with a plurality and preferably a multiplicity of metal sheets, and all of the sheets may optionally be corrugated with one or two corrugation patterns.

Other features which are considered as characteristic for the invention are set forth in the appended claims.

Although the invention is illustrated and described herein as embodied in a honeycomb body with an internal structure that is retained in a frame and a method of producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
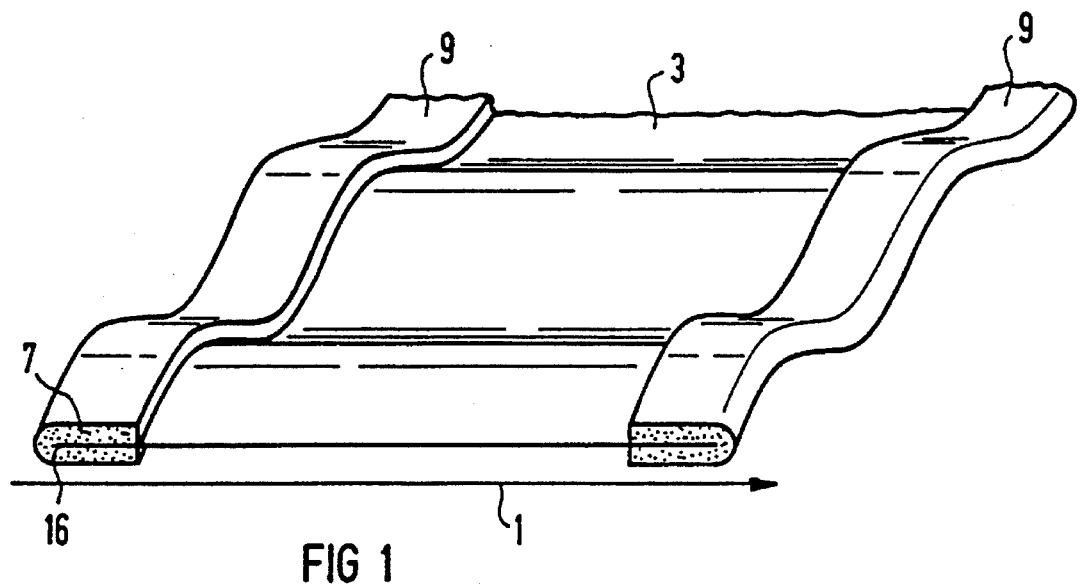
FIG. 1 is a fragmentary, diagrammatic, perspective view of a corrugated metal sheet provided with lock seams or folded joints, for use in the context of the invention.

Referring now to the figures of the drawing in detail and first, particularly, to FIG. 1 thereof, there is seen a metal sheet or sheet-metal layer 3 having end edges 16 which are encompassed by lock seams or folded joints 9. An insulating sheet 7, for instance a ceramic layer, is located between the lock seams 9 and the sheet 3 at each lock seam or folded joint 9. The sheet 3 and the lock seams or folded joints 9 are corrugated, specifically perpendicularly relative to an axis 1 of a honeycomb body to be assembled from the sheet 3.

Figure 2:
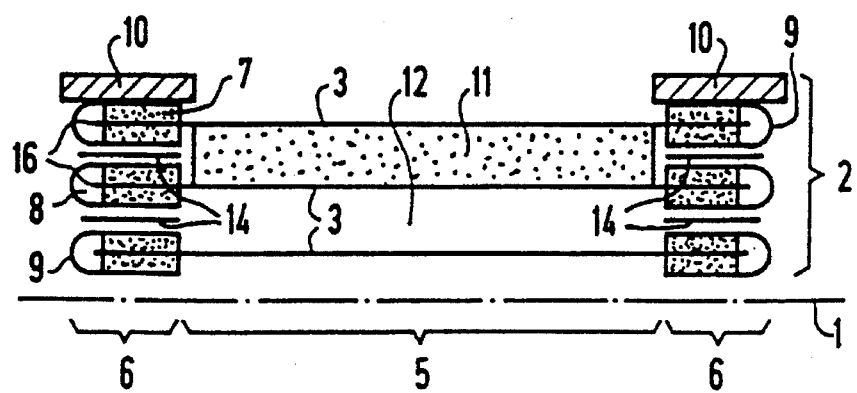
FIG. 2 is an axial-sectional view of an exemplary embodiment of the honeycomb body according to the invention.

FIG. 2 is a diagrammatic, axial longitudinal-sectional view through an exemplary embodiment of the honeycomb body of the invention.

The honeycomb body is bounded by end surfaces 2 along the axis 1. Resting on each end surface 2 is one respective frame 6, which supports an internal structure 5 formed of the metal sheets 3 that are layered and wound. Each frame 6 includes the lock seams or folded joints 9, each of which encompasses one of the end edges 16 of one sheet 3. The lock seams or folded joints 9 are insulated from the sheets 3 by the ceramic insulating sheets 7 and gaps 8. In each frame 6, one sheet-metal strip 14 is inserted between two layers formed by lock seams or folded joints 9. On one hand this sheet-metal strip 14 lowers the thermal capacity in the frame 6, and on the other hand it ensures spacings between adjacent layers in the internal structure 5. As a result, insulations 11, 12 can be provided in the internal structure 5. Such insulations may be gaps 12. A ceramic insulating sheet 11 or the like may also be inserted between two adjacent layers of sheets 3. One such insulating sheet 11 may be a ceramic fiber mat that is inserted between two layers, or a ceramic layer disposed on one of the sheets 3. Each frame 6 is mounted in a jacket tube 10, which provides additional stability for the honeycomb body.

Figure 3:
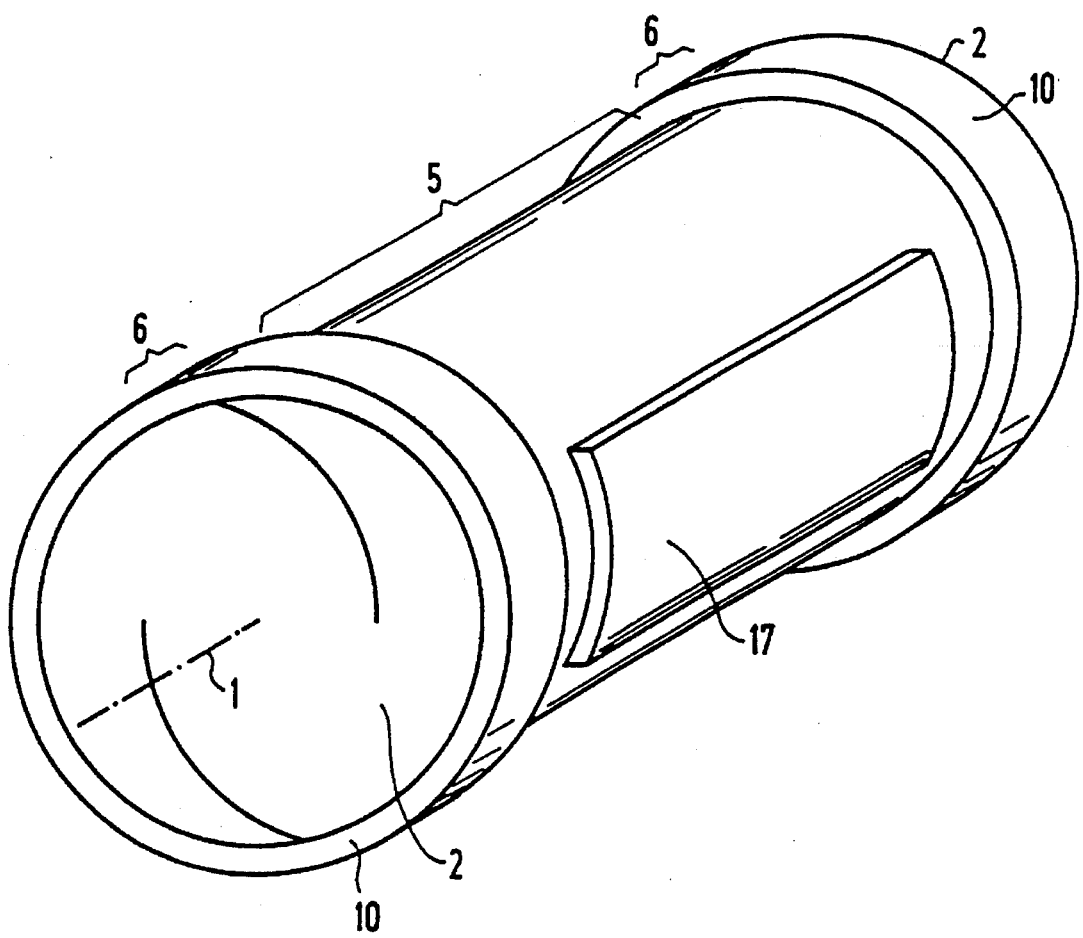
FIG. 3 is a perspective view of a further exemplary embodiment.

FIG. 3 shows a perspective or oblique view of a honeycomb body according to the invention. The honeycomb body is bounded by the end surfaces 2 along the axis 1. Located on each end surface 2 is one of the frames 6, each being mounted in a respective jacket tube 10. The directly electrically heatable internal structure 5 is located between the spaced-apart frames 6. In order to supply and dissipate the electric current required for heating, the internal structure 5 is provided with connections 17. In the perspective view chosen, only one connection 17 is visible.

Figure 4:
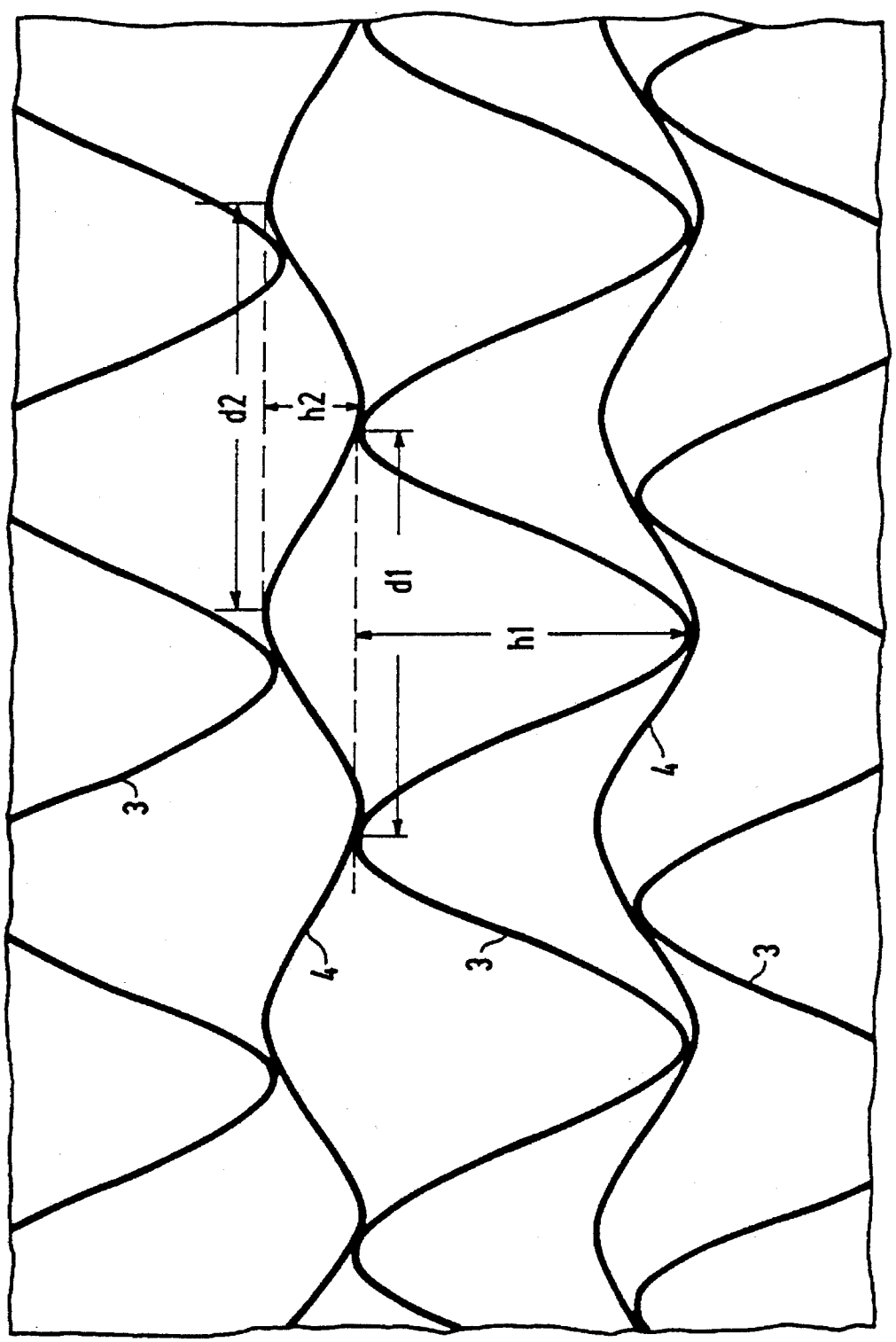
FIG. 4 is a fragmentary, cross-sectional view of a configuration of differently corrugated sheets.

FIG. 4 shows cooperation among differently corrugated sheets, namely the sheet or sheet-metal layer 3 and a sheet or sheet-metal layer 4 which are stacked on one another and may be referred to as respective first and second sheets. The first sheets 3 have a corrugation length d1, to be determined in the direction of their corrugation, and a corrugation height h1, which is the amplitude of the corrugation. The second sheet 4 has a corresponding corrugation length d2 and a corrugation height h2. The corrugation height h2 of a second sheet 2 is approximately equivalent to one-third of the corrugation height h1 of a first sheet 3. The corrugation length d2 of the second sheet 4 is approximately equivalent to the corrugation length d1 of the first sheet 3. It will be understood that the cooperation among the first sheets 3 and the second sheets 4 also depends on whether or not the sheets 3, 4 are wound, in addition to being layered. In that case, deviations from the patterns shown may arise. However, the aforementioned preferred choice for the corrugation lengths d1 and d2 and the corrugation heights h1 and h2 have proved to be generally advantageous.

Figure 5:
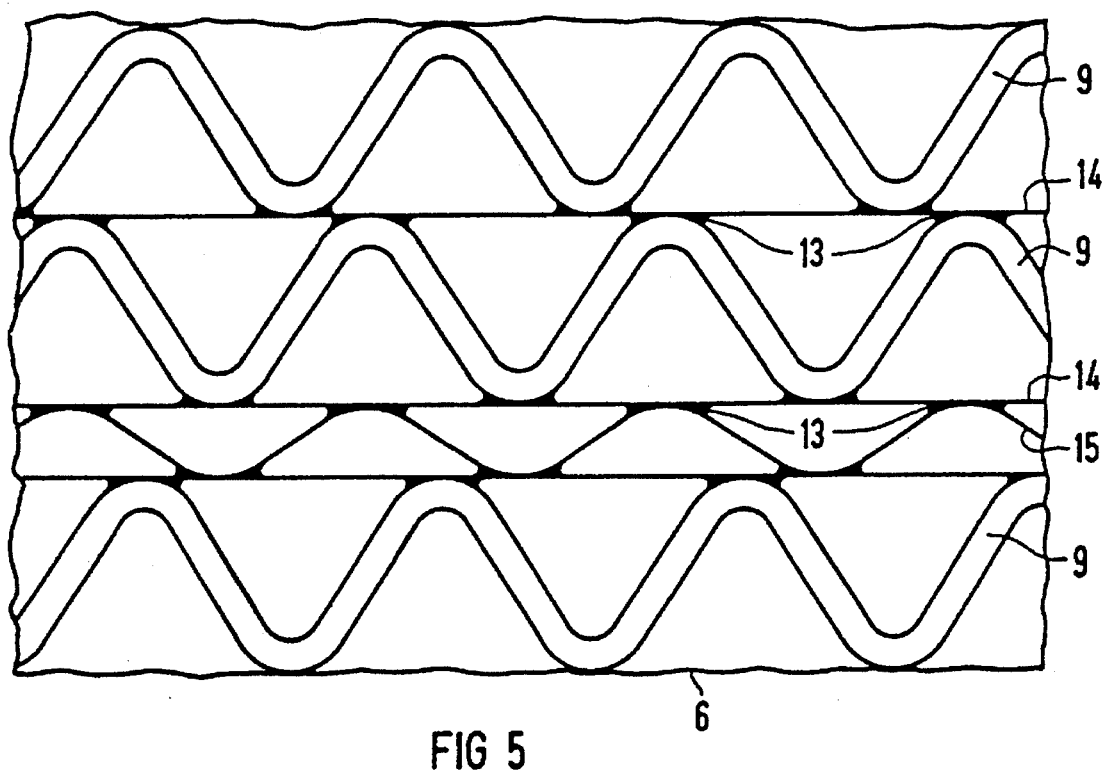
FIG. 5 is a fragmentary, cross-sectional view of a frame of a honeycomb body according to the invention.

FIG. 5 shows a fragmentary view of the frame 6 of a honeycomb body according to the invention. The frame 6 includes the lock seams or folded joints 9, the smooth sheet-metal strips 14 and corrugated sheet-metal strips 15, all of which are layered one on the other. Each lock seam or folded joint 9 encompasses one non-illustrated sheet of the likewise non-illustrated internal structure. The sheet-metal strips 14 and 15 do not protrude into the internal structure, but are limited essentially to the frame 6. FIG. 5 shows a characteristic of an especially advantageous version of the invention, namely the complete brazing of the frame 6. In fact, brazing points 13 are located at each point of contact between lock seams or folded joints 9 and sheet-metal strips 14 and 15. This makes the frame 6 quite extraordinarily stable, but the opportunity still remains of constructing the internal structure 5 in such a way as to obtain a current path with a relatively high electrical resistance that is appropriate for predetermining the heating, by providing insulating gaps, insulating sheets or the like. The sturdiness of the honeycomb body of the invention is not substantially impaired by these gaps and so forth.

Figure 6:
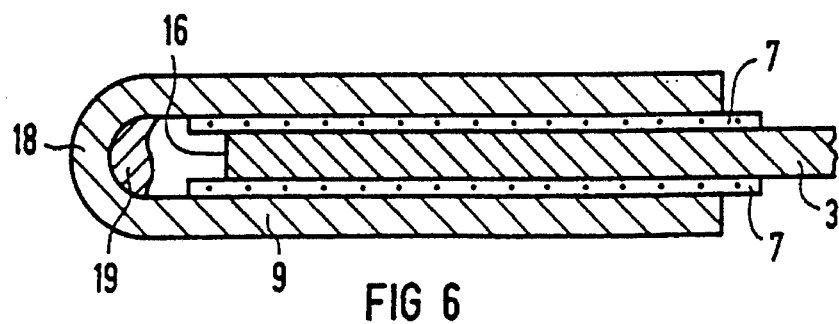
FIG. 6 is a fragmentary, cross-sectional view of a lock seam or folded joint with an additional brazing material inlay.

FIG. 6 shows a lock seam or folded joint 9, which encompasses a sheet 3 mounted in insulating sheets 7. The lock seam or folded joint 9 is folded on one end surface 18, and in the vicinity thereof and spaced apart from the end edge 16 of the sheet 3, it has a brazing material inlay 19. This brazing material inlay 19 accomplishes a certain brazing of mutually contacting regions of the lock seam or folded joint 9 and thus provides additional strength, which advantageously supplements the strength of the lock seam or folded joint 9 at the end 18, which might possibly have been restricted by the folding. It should also be noted that instead of a folded lock seam or folded joint 9, a lock seam or folded joint 9 that is formed of two parts resting on one another and being brazed at the end surface 18 may be used in the context of the invention.

In the honeycomb body of the invention, components that assure mechanical strength are separated from components that are directly electrically heatable and are constructed in accordance with a specification for the electrical resistance. The honeycomb body is simple to produce and is especially sturdy.

I claim:

1. A honeycomb body assembly, comprising:
   a) a honeycomb body defining an axis along which a flow of fluid is to be conducted through said honeycomb body;
   b) said honeycomb body being delimited by two end surfaces oppositely disposed along the axis;
   c) said honeycomb body including an internal structure disposed between said end surfaces for conducting an electric current for heating said honeycomb body, said internal structure being formed of a plurality of at least partially structured sheet-metal layers defining channels for conducting the fluid through said honeycomb body;
   d) metal support configurations each supporting an individual one of said sheet-metal layers at a respective one of said end surfaces; and
   e) an electric insulation disposed between and each of said support configurations and a respective one of said sheet-metal layers.

2. The honeycomb body according to claim 1, wherein said sheet-metal layer is retained in each of said support configurations by friction.

3. The honeycomb body according to claim 1, wherein said insulation is formed by at least one ceramic layer.

4. The honeycomb body according to claim 1, wherein each support configuration has at least one folded joint fitting around said insulation and said sheet-metal layer.

5. The honeycomb body according to claim 4, wherein said insulation is formed by a ceramic layer adhering to said at least one folded joint.

6. The honeycomb body according to claim 4, wherein said at least one folded joint has a folded edge and a brazing material inlay in the vicinity of said folded edge said brazing material inlay, being spaced apart from said sheet-metal layer.

7. The honeycomb body according to claim 1, including jacket tubes disposed at said end surfaces, each support configuration being surrounded by and secured in a respective one of said jacket tubes being associated therewith.

8. The honeycomb body according to claim 1, wherein at least one of said sheet-metal layers is corrugated and has a corrugation height and a corrugation length.

9. The honeycomb body according to claim 1, wherein said plurality of sheet-metal layers include at least one first corrugated sheet-metal layer having a first corrugation height and a first corrugation length, and at least one second corrugated sheet-metal layer having a second corrugation height and a second corrugation length.

10. The honeycomb body according to claim 9, wherein said first corrugation height is greater than said second corrugation height.

11. The honeycomb body according to claim 9, wherein said first corrugation height is at least twice as great as said second corrugation height.

12. The honeycomb body according to claim 9, wherein said first corrugation height is approximately three times as great as said second corrugation height.

13. The honeycomb body according to claim 1, wherein said plurality of sheet-metal layers together with said support configurations are wound around the axis.

14. The honeycomb body according to claim 13, including electric insulations between said sheet-metal layers of said internal structure.

15. The honeycomb body according to claim 11, wherein said sheet-metal layers are force-lockingly joined to one another.

16. The honeycomb body according to claim 15, wherein said sheet-metal layers are force-lockingly joined to one another by brazing points.

17. The honeycomb body according to claim 11, including smooth sheet-metal strips being inserted between and force-locking joined to each support configuration.

18. The honeycomb body according to claim 11, including corrugated sheet-metal strips being inserted between and force-locking joined to each support configuration.

19. The honeycomb body according to claim 11, including smooth and corrugated sheet-metal strips being inserted between and force-locking joined to each support configuration.

20. The honeycomb body according to claim 17, wherein said sheet-metal strips are force-locking joined to said support configurations by brazing points.

21. The honeycomb body according to claim 18, wherein said sheet-metal strips are force-locking joined to said support configurations by brazing points.

22. The honeycomb body according to claim 19, wherein said sheet-metal strips are force-locking joined to said support configurations by brazing points.

\* \* \* \* \*